(12) United States Patent
Sloth et al.

(10) Patent No.: US 10,234,535 B2
(45) Date of Patent: Mar. 19, 2019

(54) COMPUTER SYSTEM FOR MEASURING REAL TIME POSITION OF A PLURALITY OF ANIMALS

(71) Applicant: GEA Farm Technologies GmbH, Bonen (DE)

(72) Inventors: Karen Helle Sloth, Engesvang (DK); Daniel Frederiksen, Svendborg (DK)

(73) Assignee: GEA Farm Technologies GmbH, Bönen (DE)

( * ) Notice: Subject to any disclaimer, the term of this patent is extended or adjusted under 35 U.S.C. 154(b) by 585 days.

(21) Appl. No.: 14/439,190

(22) PCT Filed: Oct. 28, 2013

(86) PCT No.: PCT/EP2013/072495
§ 371 (c)(1),
(2) Date: Apr. 28, 2015

(87) PCT Pub. No.: WO2014/067896
PCT Pub. Date: May 8, 2014

(65) Prior Publication Data
US 2015/0293205 A1    Oct. 15, 2015

(30) Foreign Application Priority Data
Oct. 31, 2012    (DK) .................................. 2012 70668

(51) Int. Cl.
*A01K 29/00*    (2006.01)
*G01S 5/02*    (2010.01)
(Continued)

(52) U.S. Cl.
CPC .......... *G01S 5/0252* (2013.01); *A01K 15/023* (2013.01); *A01K 29/005* (2013.01); *G01S 5/021* (2013.01); *G01S 5/14* (2013.01)

(58) Field of Classification Search
CPC .... A01K 15/023; A01K 29/005; G01S 5/021; G01S 5/0252; G01S 5/14
(Continued)

(56) References Cited

U.S. PATENT DOCUMENTS 6,473,038 B2    10/2002    Patwari et al.
7,009,561 B2    3/2006    Ortyn et al.
(Continued)

FOREIGN PATENT DOCUMENTS

CN    101694716 A1    4/2010
EP    0945060 A2    9/1999
(Continued)

OTHER PUBLICATIONS

International Search Report for corresponding Application No. PCT/EP2013/072495 dated Apr. 23, 2014.
(Continued)

*Primary Examiner* — Timothy A Brainard
(74) *Attorney, Agent, or Firm* — Smith Law Office; Jeffry W. Smith

(57) ABSTRACT

The present invention relates to a computer system for measuring real time position of a plurality of animals, which system receives input from a plurality of sensors, communicating with at least tags carried by the animals, which system based of measurement of delay in radio communication calculates the actual position of the animals. It is the first object of the invention to achieve real time position of animals in a limited area. A further object is based of the real time position to analyze the behavior of each of the animals. The sensors further performs communication with a plurality of reference tags, and performs a calibration of the real time position measured by the system, which system comprises a CPU with at least two cores, which system divides the data processing in a first real time position processing in
(Continued)

the first core of the processor, and into a second processing of the activity of the animals performed in the second core of the processor. By using fixed reference tags together with tags, it the computer system performs an automatic calibration of all received signals from animals.

15 Claims, 5 Drawing Sheets

(51) Int. Cl.
    *A01K 15/02*     (2006.01)
    *G01S 5/14*     (2006.01)

(58) Field of Classification Search
    USPC .......................................................... 342/451
    See application file for complete search history.

(56) References Cited

U.S. PATENT DOCUMENTS

| | | |
|---|---|---|
| 2002/0010390 A1 | 1/2002 | Guice et al. |
| 2004/0260506 A1 | 12/2004 | Jones et al. |
| 2005/0020279 A1* | 1/2005 | Markhovsky ......... G01S 5/0294 455/456.1 |
| 2006/0259831 A1* | 11/2006 | Sohm .................. G06F 11/3471 714/45 |
| 2007/0008150 A1 | 1/2007 | Hassell |
| 2007/0040739 A1 | 2/2007 | Small |
| 2007/0268138 A1 | 11/2007 | Chung et al. |
| 2008/0154138 A1* | 6/2008 | McQuilkin ............ A61B 5/015 600/473 |
| 2009/0201169 A1 | 8/2009 | d'Hont et al. |
| 2010/0291879 A1* | 11/2010 | Konishi ................ G01S 5/0252 455/67.11 |
| 2011/0102154 A1* | 5/2011 | Hindhede ............ A01K 29/005 340/10.1 |
| 2011/0187591 A1* | 8/2011 | Walker, Sr. ............ G01S 19/46 342/357.29 |
| 2012/0188129 A1* | 7/2012 | Ameti ...................... G10S 5/10 342/451 |
| 2012/0238912 A1 | 9/2012 | Rajkondawar et al. |
| 2015/0110202 A1* | 4/2015 | Tucker ................. H04L 65/607 375/240.26 |
| 2015/0237833 A1 | 8/2015 | Florczak |

FOREIGN PATENT DOCUMENTS

| | | |
|---|---|---|
| PA | 201270668 | 10/2012 |
| WO | 02054100 A2 | 7/2002 |
| WO | 2006096932 A1 | 9/2006 |
| WO | 2007103886 A2 | 9/2007 |
| WO | 2008113556 A1 | 9/2008 |
| WO | 2009135493 A1 | 11/2009 |
| WO | 2010066429 A1 | 6/2010 |
| WO | 2010108496 A1 | 9/2010 |

OTHER PUBLICATIONS

International Search Report and Written Opinion for International Application No. PCT/EP2013/072502 dated Jan. 9, 2014.

* cited by examiner

COMPUTER SYSTEM FOR MEASURING REAL TIME POSITION OF A PLURALITY OF ANIMALS

FIELD OF THE INVENTION

The present invention relates to a computer system for measuring real time position of a plurality of animals, which system based of real time position of the animals determine behaviour of the animals, which system receives input from a plurality of sensors, which sensors communicates at least with radio receiver/transmitter tags carried by the animals, which system based of measurement of delay in radio communication between the radio receiver/transmitter tags and the sensors calculates the actual position of the animals.

BACKGROUND OF THE INVENTION

WO2010DK50065 discloses a system and a method for detecting the behaviour of a number of animals, such as cattle, where each animal carries at least a number of detectors, which detectors are communicating with at least a first processor carried by the animal, which first processor further communicates with a central processor. The object of the invention is to detect animal behaviour and transmit data concerning the animal behaviour to a computer system for further analysis of the data. This object can be achieved by a system and if the system and method are further modified by letting the animal carry an accelerometer and a gyroscope for detecting movement of the animal, which system comprises at least a short-range communication system for transmitting data from the first processor to the second central processor. By using an accelerometer and a gyroscope placed at an animal, this accelerometer and gyroscope can detect the behaviour of the animal.

SUMMARY OF THE INVENTION

It is the first object of the invention to achieve real time position of animals in a limited area. A further object is based of the real time position to analyse the behaviour of each of the animals.

The object can be fulfilled by a system as disclosed in the preamble to claim 1 and further modified in a way where the sensors further performs communication with a plurality of reference radio receiver/transmitter tags, which system based of measurement of the position for the reference radio receiver/transmitter tags performs a calibration of the real time position measured by the system, which system comprises a Central Processing Unit (CPU), which CPU comprises at least two cores, which system divides the data processing in a first real time position processing in the first core of the processor, and into a second processing of the behaviour of the animals performed in the second core of the processor.

By using fixed reference radio receivers/transmitters together with tags that are performing equal radio receiver/transmission functions, it is possible by fixed placed sensors to receive first signals from the animal tags, but also signals from the fixed reference radio receiver/transmitter tags and in that way by the computer system to perform an automatic calibration of all received signals from animals. At least two sensors must receive same signals from both the animal tag and the fixed tag. In that way, it is possible for the system by measuring run time or face difference for signals received that are responding to a signal sent from the sensor. Because the tags have a synchronous period for sending, it is possible by time difference or face difference in the received signals to form very precise calculation of the position of the animal tag. If more sensors are receiving the same signals, it is possible even to get a more precise position of the tag at the animal. Hereby can be achieved a very precise real time position indication of a number of animals placed in a restricted area such as in a barn. Because the real time position is indicated and afterwards stored in the computer system, it is possible by further data analyses to get a good indication of the behaviour of the animals placed in the restricted area or in the barn. Because of the number of data that is received from different sensors communicated from tags where a high number of animals together with a relative high number of reference tags are transmitting data, the computer system can be totally overloaded in handling position data. By using a sensor processing unit having at least the two cores, it is possible in the software to decide that one of the cores is handling the position indication where the other core is handling further information. In that way, parallel processing is performed. Probably more than two cores will be used or more CPUs are operating more or less in parallel whereby is achieved that parallel processing is performed where a number of parallel processing takes place. Because position data has to be formed immediately only a relative fast and highly effective filtration is possible. The system is able to detect the actual position of each animal that is surveyed by the system several times per second. Therefore, the fast processing is necessary and also filtration has to be performed by the fast processing. The other core in the processor is processing the behaviour of an animal that means that processor analyses a high number of position data in order to define any change in activity of the animal. Analysing of position data over several hours is probably necessary. Therefore, the job of the second core in the processor is different from the first core. Today where four core processors are available and used in many small computers, there is no doubt that in the future multi-core processors will be available to a very low price and probably multi-core processors will be used in a system as described previously.

In a preferred embodiment the input for measurement of the real time position is perform by a Real Time Location System (RTLS). Using the real time location system will perform raw data for the indicated position for both animal tags and reference tags directly to the processor and the first core of that processor can in that situation overcome the necessary filtration for a high number of position indications per second so that the first core of the processor has the necessary capacity for delivering precise position information of a high number of animals so that the position is indicated several times per second.

In a further preferred embodiment the system uses the first CPU core for a quick noise reduction algorithm for generating data for display an animal position overview. By a quick noise reduction, it is possible to get a sufficient position overview which can be achieved very fast, because the quick noise reduction is not reducing the speed of the processor core sufficiently.

In a further preferred embodiment the system uses the second CPU core for complicated noise reduction methods of the data in order to analyze the activity of the animals, which data are accumulated over a short period, which data are calculated on a plurality of data points. Activity of animals can only be determined by analyzing position in a defined data processing a period. Therefore, it is necessary to analyze a rather great amount of data to perform analyze of activity. That can be achieved by having one or more processor cores operating only for this purpose. If more than 100 animals have to be surveyed, the activity analysis for each animal can over load a single processor. Therefore, one of the second cores of the processor can perform this relatively time consuming operation. Also a more precise noise reduction can be performed and a more precise indication of the actual activity of each animal can be detected.

In a further preferred embodiment data is received from an interface to the RTLS timestamp and to each piece of data is applied a system time stamp. In that way can be achieved that independent of the RTLS timestamp, the timestamp for receiving a data segment is that segment which is used for the further processing of data. There could be situations where the RTLS system maybe has a small delay in the signals delivered, but that delay has only limited influence on the further processing, but it is very important for the system to have a nearly perfect timestamp in order to perform analysis of received data independent of the receiving time.

In a further preferred embodiment position data is received is processed in the order the data was received, which data is placed in a First-In-First-Out stack (FIFO), where the oldest measurements are processed first. The use of a First-In-First-Out stack in the computer system can have the result that the RTLS system can deliver data independent of the speed of operation in the computer system. In some situations, the RTLS-system might sense a lot of data, because there is a high success in radio communication where a few seconds later there is some disturbance in the radio communication and no data is transmitted. In a situation where no data is received or a number of data is reduced, the processor can still operate at full speed, because data are always available in the First-In-First-Out stack.

In a further preferred embodiment the system processes several strings of location information at the same time, where the exact number of parallel processing threads is setup in a configuration file. The performance of the code and the PC is sufficient, so that the data of the current installations can be processed upon arrival. Therefore it has so far not been necessary to implement an overflow protection mechanism to discard old data in case of delays. For larger systems, it will instead be possible to use a computer which can perform the processing in more parallel strings and therefore any overloading of the computer system will still be prevented.

In a further preferred embodiment the system comprises a Movement Module, which Movement Module receives time stamped RTLS positioning data, which Movement Module generates a output as a point with a zone attribute, which Movement Module comprises noise reduction filters at least such as Median and Exponentially Weighted Moving Average (EWMA). The median is computed on each data point coordinate in a moving window of N data points. This means that every data point is replaced with the median of this data point and the N−1 previous data points. The median is configured with one parameter, which is the number of data points in the window. A large number of data points will make the measurements appear smoother, but may also affect the accuracy. The number of data points to mediate is configured differently for each farm and for each of the two calculation tracks. The EWMA is configured with the exponential factor to apply to old data points. This may likewise be configured differently for each farm and for each of the two calculation tracks. The EWMA algorithm does not reduce the amount of location data points, but adjusts the current point according to the earlier measurements.

Hereby is achieved that very precise measurement of the tags placed on the animals is performed after the EWMA algorithm is performed. In that way even small deviations in position of animals can be used for the analysis of the animal activity, and this measurement will in no way conflict the fast data processing that is used for an overview of the exact position of animals.

In a further preferred embodiment the system comprises a cluster module, where a cluster is defined by an aggregated set of location points where the points calculated by the Movement Module are aggregated into a cluster if they are at the approximate same position at the approximate same time. The cluster has one location position, a zone attribute and a trip count. The trip count is the number of points that are represented by the cluster. If an animal stands still or moves very slowly, there will only be a limited number of clusters with a high trip count. If an animal moves at a higher speed, there will be many clusters with a low trip count. The Cluster Module has an algorithm for determining the validity of the data. If the animal appears to have jumped, say, 10 meters in a few seconds, the Cluster Module applies an algorithm to determine whether the current cluster or the previous cluster is erroneous. More precisely, a maximum speed is applied to discard points that are too far away from the current cluster. The cluster calculation has two main parts, Calculation of clusters and Calculation of "confirmed" clusters. By calculation of clusters a cluster has a time, $c_{time}$ and a centre c. When a new point arrives, one of the following things happens, The point is taken into the cluster, and the cluster centre and time are be adjusted or a new cluster is started or the point is discarded. Furthermore, the Cluster Module has an algorithm for further processing of the clusters. This algorithm merges neighbouring clusters if one of the clusters contains only one point, and the distance between cluster centers is low. The cluster is merged by at least the following operations; the center c is calculated as the weighted average of the centre coordinates in the two clusters. The weights are the number of points in the clusters. The time period is from the start of the first cluster to the end of the last cluster. The count of data in the merged cluster is the sum of the two data counts. A cluster is final if it cannot be merged with a neighboring cluster. The Cluster Module uses the definition of zone boundaries to determine a list of zones that the cluster belongs to. Finally, the cluster is classified as walking or not walking. The cluster is classified as walking if the following requirements are all fulfilled. The cluster centre is inside a walking zone. The cluster time interval is less than a certain threshold, e.g. 1 second. If the cluster is classified as walking, the animal is classified as walking in the corresponding time interval. The distance is calculated as the distance between the cluster centre and the previous cluster centre. Hereby is achieved that a very effective computer analysis can be performed, because with a high probability the animal will remain in the cluster for a period. Therefore, the computer system by making clusters around an animal saying that the animal is inside this cluster, only if the tag1 leaves the cluster further fast operating position analysis is necessary.

In a further preferred embodiment the system comprises an Activity module, which Activity module defines at least the following prioritization:

1. At the watering trough
2. At the feeding table
3. In bed
4. Out definitive
5. Walk
6. Standing 7. Waiting
8. Selecting
9. Unknown.

The walking zone is a special case, since the animal may be standing or walking in this zone. When an animal is in the walking zone, the activity is set to standing if the time span of the cluster is more than 1 second. Note that this only applies to the waking zone. The Activity Module applies no noise reduction. The activity is reported immediately for each confirmed cluster.

In a further preferred embodiment the Activity Module accumulate activity data for each animal, which Activity Module analyses the animal's current behaviour, which current behaviour is compared to the same animal's past behaviour to set an alarm for high or low activity or an old alarm should be deactivated, for the high activity alarm the current behaviour is calculated based on a relatively short time frame such as a few hours, whereas the low activity alarm is raised based on the behaviour during a longer time period, where normal animal behaviour is calculated over an even longer time period spanning several days. This process calculates the behavioural characteristics of animals in a reference group. This is used to show the behaviour of a animal in a polar plot compared to the to the reference group. This process compares the actual animal which the behaviour of the reference group. This may be, for example, "Young stock" or "Pre calving heifers". The purpose is to apply different levels for the alarms for animals in various states. The virtual group is written to the database for each animal, and the value is used for the calculation of alarms by the "activity process". Further can some animal be placed at an Inspection List. This process assigns animals to inspection lists, for example cows that have recently given birth.

In a further preferred embodiment the system comprises a Kalman filter, which Kalman filter combines prediction of the animal position, possible speed, etc. with knowledge of the variation in the measurements, which Kalman filter perform estimate of the animal position and the measurement are combined as a weighted average with a complex algorithm for determining the weights used. The Kalman filter is self-calibrating in the sense that the covariance estimates are updated during runtime based on data observations. The Kalman filter is configured with the following parameters:

Median length
Observation covariance (e.g. 400)
Model Position Covariance (e.g. 10). Self-calibrating.
Model Speed Covariance (e.g. 10). Self-calibrating.
Reset Timeout (e.g. 10 seconds).

The implementation can be based on a open-source library Eigen (eig-en.tuxfamily.org).

In a further preferred embodiment the system communicates with a Central Backend computer system, which Central Backend computer system performs a number of processes that each performs specific tasks for calculation of animal data.

In a further preferred embodiment the Central Backend computer system handles an ADIS requests used for integration with one or more defined Dairy Plans, which Central Backend computer system generates the ADIS requests. This process handles the ADIS requests used for integration with GEA Dairy Plan. The central backend generates the necessary ADIS requests. Note that one ADIS request may contain several data requests. The ADIS proxy (running at the farm Windows PC) checks at short intervals whether there are any queued requests for the current installation (by a request to the Central Backend). If one or more requests are found, these are handled by the Location Backend, and the response is sent back to the Central Backend for parsing.

In a further preferred embodiment the Central Backend computer system generates at least requests every twelve hours, where two requests are generated for each installation, the first of these is a request for all historical data and the second is a request for the current state. The following can be retrieved by the Location Backend, Boundaries, Hosts (animals), Tags, Module settings, i.e. parameters for modules in Location Back-end. The following data can be pushed from the Location Backend to the Central Backend, Activities, Real time positions.

DETAILED DESCRIPTION OF THE INVENTION

Figure 1:
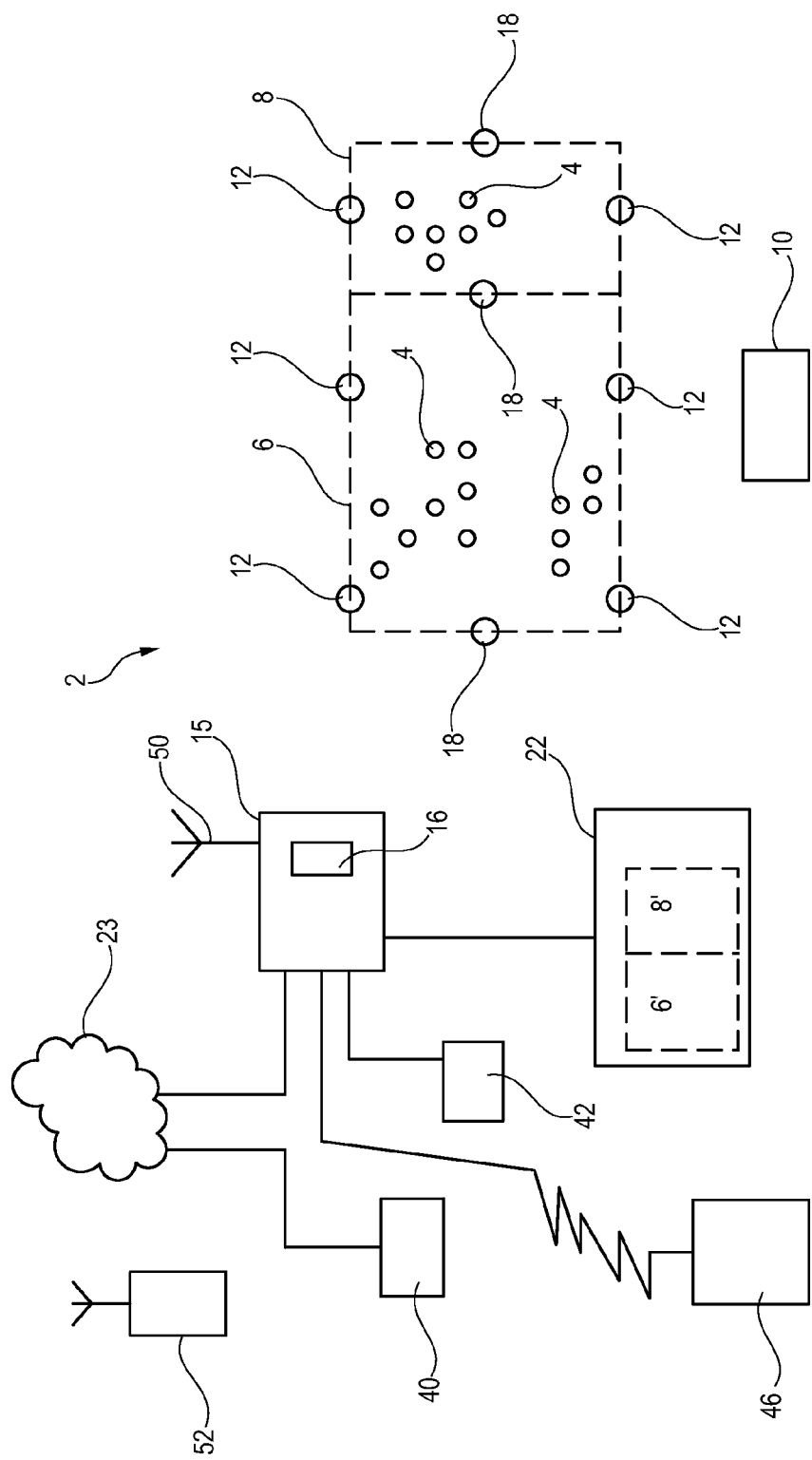
FIG. 1 is a schematic of a system for measuring real time position of a plurality of animals in accordance with the present invention.

FIG. 1 discloses a possible embodiment for a system 2, which system comprises a restricted area 6 and/or a restricted sub area 8. In the restricted area 6,8 is indicated animals 4. These animals all carry a transmitter tag 10 which in a preferred version transmit a signal with time intervals controlled in the software of the tag. That means the tag 10 may transmit a signal one ore more times per second. The system 2 further comprises a plurality of sensors 12 here indicated at the border of the restricted area 6,8. Further is indicated fixed reference tags 18 here indicated in the middle of the restricted area 6,8. The system further comprises a farm server 15 which farm server comprises a position detection system 16. The system 2 generates a map 22 which map 22 shows the restricted area 6',8' and not shown, but in practice indicating the animals 4 at the map. The farm server 15 is further connected to the internet 23 and through the internet 23 there is a connection to any computer 40 that has a necessary logon access into the farm server 15. Further is the farm server 15 connected over maybe an optical fibre connection to a back end computer 46. The farm server 15 further has wireless communication system 50 for connecting mobile devises 52, but once again communication is only performed to mobile devises having the necessary logon information ready, so it is more or less a closed communication from the mobile devise 52 to the mobile interface 50 and into the computer 15.

In operation, the backend computer 46 by installing a new system will perform a calculation of at first the necessary number of sensors 12 for a restricted area 6,8 or a barn 24 and the computer system 46 will also calculate the placement of sensors 12. Afterwards will the computer system 46 calculate the necessary reference tags and their placement in the restricted area 6,8 or the barn 24. Afterwards an installing process is performed where the sensors 12 and the reference tags 18 have to be placed as already indicated from the backend computer 46. The installing process also performs the installation of the server 15, and the connection of that server to the internet and by the wire communication or optical fibre communication or any other form for communication to the backend computer 46. Hereafter can a test be performed at first without tagged animals in the restricted area 6,8 and afterwards can animals 4 carrying the tag 10 be placed in the restricted area 6,8. The system will hereafter perform a indication of the position of the animals 4 several times per second. Because the sensors 12 together with signals from tags 10 will receive signals from the fixed tags 18, the system is able to perform calibration of the measured positions. The computer system 15 can after a short measuring period analyse the activity of the animals 4. At relatively long time intervals, the server 15 can transmit a report into the backend computer 46. This backend computer 46 can then perform analysis of the behaviour of the animals. This backend computer can then generate rather complicated report without help from the farm server 15.

Figure 2:
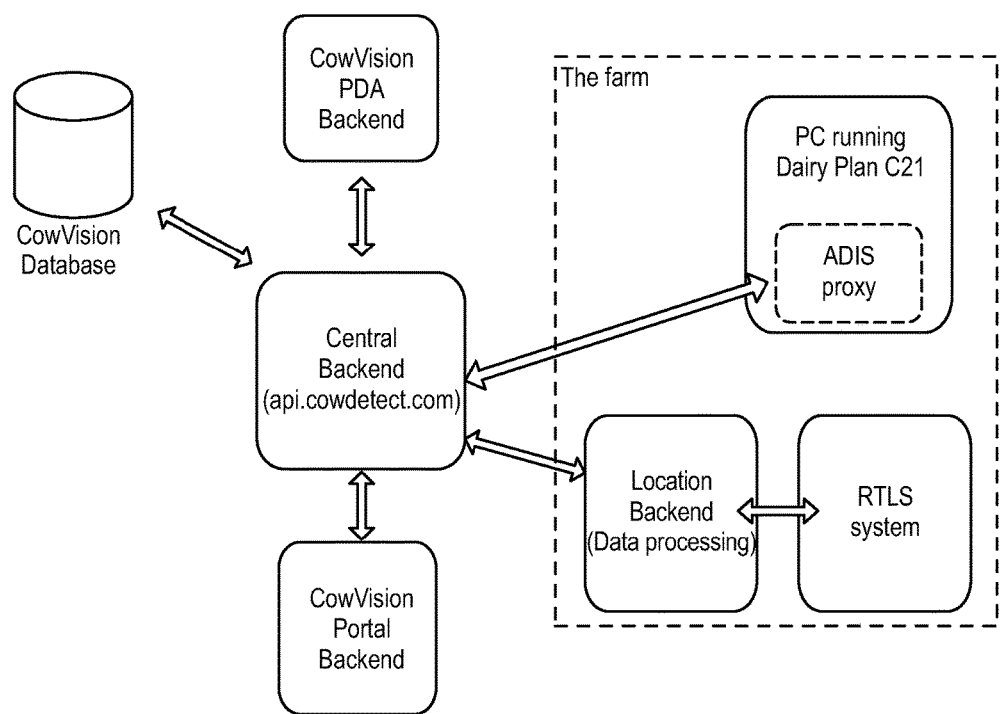
FIG. 2 is a schematic flow chart for an animal view system in accordance with the present invention.

FIG. 2 discloses an animal view system, which system gets the identifiers of the animals 4 and information about inseminations etc. from integration with external systems. The integration to external severs is done with web service calls from the central backend. This must be configured with a user name and password in order to work. The integration to the program is done by a small Windows program called "ADIS proxy". This program must be installed on the same PC as the program. The program makes a request to the program which exports data to a file. The ADIS proxy then analyzes the file and sends the result to the central backend. The local installation at the farm comprises the RTLS components and a local server. The details of these technologies are documented by the vendors, so only a brief overview of the preferred system, will be given here. Other systems can be used in the future.

The system is based on ultra wideband. A installation consists of:

A Hub
A number of sensors
A tag for each animal

The components in the installation only need one cable holding both network and power. The Hub has certain capacity limitations. Therefore a large installation with more than one large barn 24 will need to be based on more than one Hub. The system delivers two-three positions per tag per second as configured in a configuration setting. The animal tag is applied around the neck of the animal. It contains the RFID tag for tracking and batteries for long time usage. The system is configured with the precise position of each sensor. Furthermore, the barn must be divided into a number of virtual groups. A virtual group is defined as a physical area in the barn. For each virtual group it is defined which sensors are allowed to contribute to the location data in that area. The virtual group is a method applied by both to eliminate outliers and to reduce the amount of data for processing.

A server 15 is located at the farm. The server 15 boots from a USB stick that contains the software used by the server. This includes among other things:

Basic settings (configuration file)
Operating system:
Location backend

The server checks for new versions of its own software via a request to a central server. The animal View software running on the local backend is developed in C++. Its basic functions are to:

Collect and process data
Deliver position data so that the cows can be shown graphically on a barn drawing
Deliver activity data The PDA web application can be a Flash application written in Action script. The application is used from a browser in a PDA, which is delivered together with the product. The application may also be used from a smart phone browser. The animal View Portal is written in the programming language PHP. All plots and the barn 24 overview are embedded flash elements.

The animals 4 produce a lot of location data. In an installation, data for each animal 4 is collected two-three times per second. Since the bandwidth out of the farm is limited, a lot of data pre-processing is done at the farmer's local server 15. The precision of the measurements is very high, but due to reflections and physical obstacles, the location of the animal 4 may momentarily shift by up to 30 meters. Therefore a large task in the data processing is "noise reduction", i.e. smoothing out the data and disregarding measurements that are considered erroneous. The data is processed in two different ways for the following two purposes:

Display data: For the purpose of generating data for display in the barn overview, a quick noise reduction algorithm is applied. In order not to cause delays, these calculations can only involve a very limited number of data points.

Activity data (classification): More complicated noise reduction methods are applied in order to analyze the behavior of the cow. These data are accumulated over several hours and can therefore be calculated on a larger number of data points.

The animal View system must have knowledge of the location of feeding area, beds etc. for the calculation of animal activity data. This is configured as a number of zones in the animal View portal. The zones are then used by the data processing software for calculating the time used for walking, standing, sleeping and eating. A zone definition can be defined as visual, calculative or both. A visual zone is shown in the barn over-view. A calculative zone is used for the activity calculations. The calculative zones are defined so that they give the best results in the calculation of activities. It is, for example, often useful to define the calculative feeding area as slightly larger than the physical feeding area. This gives the most accurate result for the eating time, since the cows do not stand inside the feeding area while eating. The zones are defined as polygons by defining the coordinates of their corners in clock-wise order.

Figure 3:
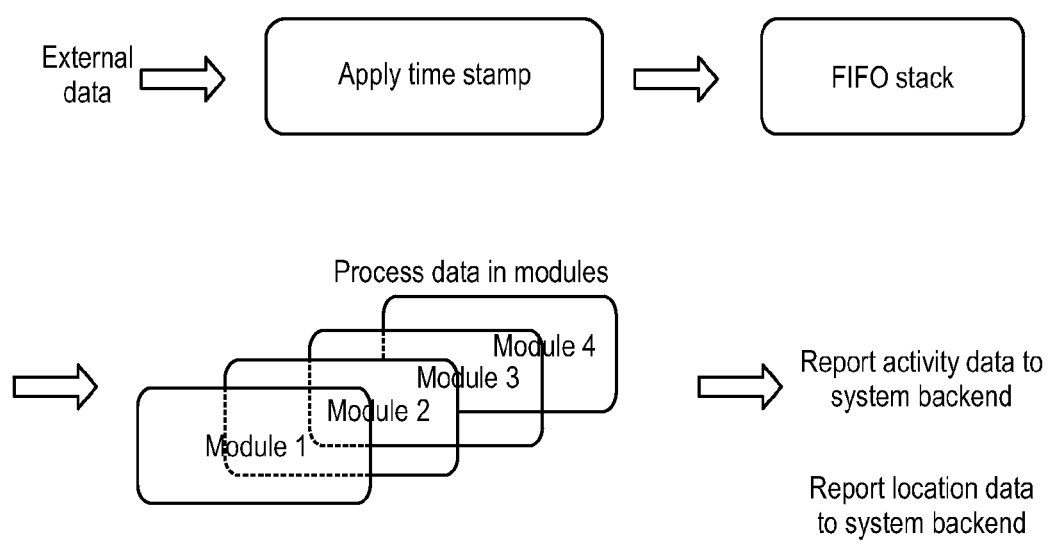
FIG. 3 is a schematic flow chart for data to be processed in accordance with the present invention.

FIG. 3 indicates that the data is processed in a series of modules. One module delivers input data for the next module. The modules themselves have no knowledge of the internals of other modules, and are therefore only dependent on the data structures that they exchange. When data is received from the interface to the external RTLS, the first task carried out is to apply a timestamp to each piece of data. The system clock of the farm server is synchronized using the NTP protocol. Although the RTLS vendor provides a time stamp, this additional time stamp is applied in order to ensure a consistent, vendor-independent timestamp and ensure synchronization with timing in backend systems. The position data is then processed in the order the data was received. The data is placed in a First-In-First-Out stack (FIFO), meaning that the oldest measurements are processed first. The farm server processes several strings of location information at the same time: the exact number of parallel processing threads is setup in the configuration file. The performance of the code and the PC is sufficient, so that the data of the current installations can be processed upon arrival. Therefore it has so far not been necessary to implement an overflow protection mechanism to discard old data in case of delays. The data processing is, in fact, done in two different parallel tracks for the display data and activity data. The processing is handled by two different sequences of modules:

1. Real time processing for location display
2. More complex processing for activity calculations The main part of the data processing is done in a chain of data processing modules. Each module gets input from the previous module and delivers output to the next module.

The data is analyzed in two different tracks:

1) The first track performs a quick noise reduction on a limited set of data points. This is for the display of animal locations.
2) The second track is for calculation of activity data. Here more noise reduction is applied and the position is analyzed in order to determine animal activities.

Figure 4:
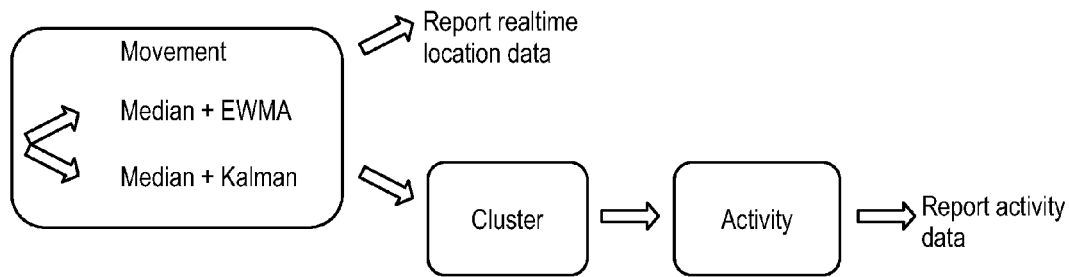
FIG. 4 is a movement module flow chart in accordance with the present invention.

FIG. 4 discloses a Movement Module. The input to the Movement Module is the timestamped RTLS positioning data. The output from the module is a point with a zone attribute. The primary calculations in the module are the following noise reduction filters:

Median

Exponentially Weighted Moving Average (EWMA)

The median is computed on each data point coordinate in a moving window of N data points. This means that every data point is replaced with the median of this data point and the N−1 previous data points. The median is configured with one parameter, which is the number of data points in the window. A large number of data points will make the measurements appear more "smooth"—but may of course also affect the accuracy. The number of data points to mediate is configured differently for each farm and for each of the two calculation tracks.

The EWMA is configured with the exponential factor to apply to old data points. This may likewise be configured differently for each farm and for each of the two calculation tracks. The EWMA algorithm does not reduce the amount of location data points, but adjusts the current point according to the earlier measurements.

Figure 5:
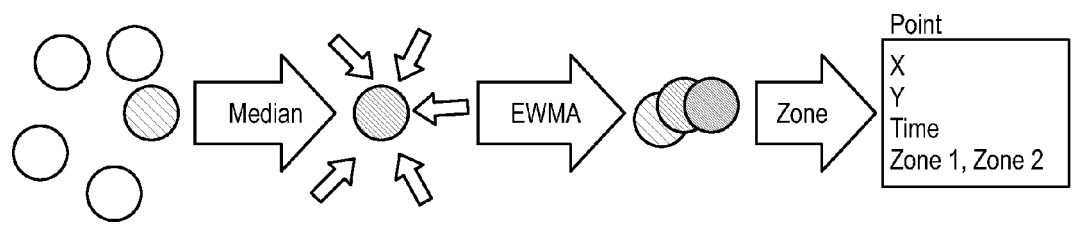
FIG. 5 is the movement module of FIG. 4 displaying zones defined in an animal view portal.

FIG. 5 discloses the Movement module, which Movement module now considers the zones (calculative zones) that are defined in the animal View portal. The system determines which of the zones that the current location belongs to. After this has been calculated, the system now constructs a Point object, which holds the following information:

The coordinates of the current location (after applying median and EWMA)

The timestamp of the location

A list of the zones that the current location belongs to

The Point object is now reported directly to the central backend. Before the point is handed over to the Cluster module it goes through calculations in order to classify the animal as moving or not moving at the time of the point. After the simple data analysis, the data is analyzed with the purpose of classifying when the animal is moving and when the animal is in a steady position. This classification is based on changes in the direction and speed of the animal. When the animal is moving, its direction is relatively constant and its speed is above a certain threshold. The data points are therefore monitored in order to detect when an animal has high speed and a steady direction.

Figure 6:
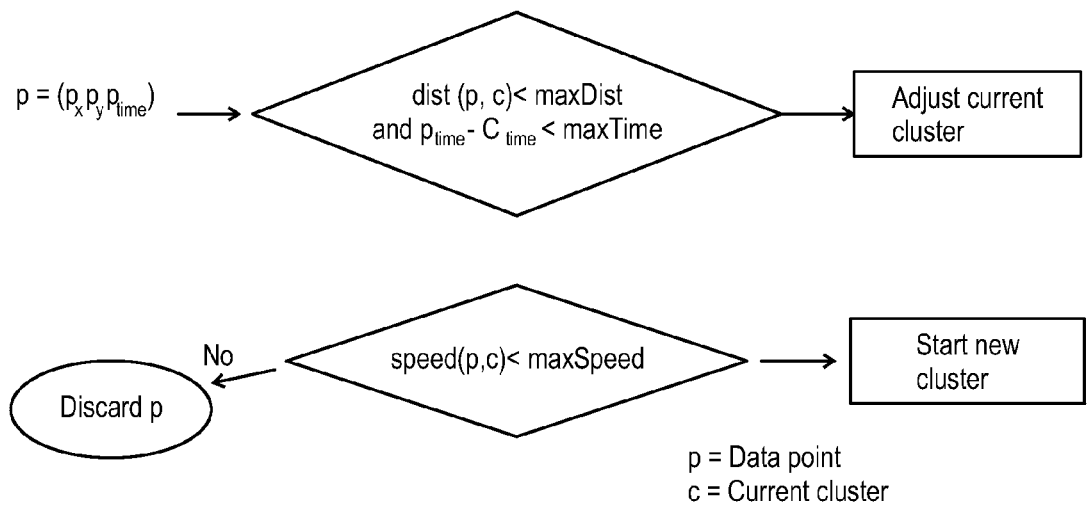
FIG. 6 is a flow chart for analyzing data points in groups.

FIG. 6 discloses a detailed description. The data points are analyzed in groups corresponding to rolling time intervals of a certain length. There should be 10-12 or more data points per interval and the interval length should be around 10 seconds. The data points within each time interval is then analyzed to see whether the point indicates extreme speed and/or extreme direction change. The direction is calculated as the numerical value of the difference in the angles that are shown on the FIG. 6. The direction is calculated as the angle between the line connecting two data points. The figure shows two different directions between points 1 and 2 and between points 2 and 3. The change in two consecutive angles such as 28 degrees is used to determine whether the animal is moving. Since each animal shows unique behavioural patterns, the location data for an animal is compared to historical data for the same animal.

The historical data is calculated in a rolling window of 6 hours. For these 6 hours the following data is calculated:

The mean and standard deviation of the change in the direction between two consecutive data points The mean speed and standard deviation of this When the real-time data is analyzed, a window of X data points yields X−1 values of the following:

Direction (angle)

Speed

If there are X values in the time interval, X−1 angles are calculated. This results in X−2 values for the difference between consecutive angles. Each of the X−2 values is now classified as extreme if its numerical value is greater than the ⅙ of the standard deviation of the historical data. The X values in the time interval result in X−1 values for the speed of the animal. Each of the X−1 values is now compared to the average speed of the historical data. If the speed is higher than ¼ of the standard deviation in the speed of the historic data, then the data point is classified as extreme with respect to speed. An interval is now classified as moving if both of the following conditions are true:

If less than 45% of the X−2 values for direction change are extreme

If more than 20% of the X−1 values for speed are classified as extreme

This means that for each animal some time intervals are considered as "moving" and others as "not moving". This value is transferred to the Cluster module.

Note that if a time interval contains 7 or fewer data points, it is always classified as not moving.

A Cluster is an aggregated set of location points. In other words, the points calculated by the Movement Module are aggregated into a cluster if they are at the approximate same position at the approximate same time. The cluster has one location position, a zone attribute and a trip count. The trip count is the number of points that are represented by the cluster. If an animal stands still or moves very slowly, there will only be a limited number of clusters with a high trip count. If an animal moves at a higher speed, there will be many clusters with a low trip count. The Cluster Module has an algorithm for determining the validity of the data. If the cow appears to have jumped, say, 10 meters in a few seconds, the Cluster Module applies an algorithm to determine whether the current cluster or the previous cluster is erroneous. More precisely, a maximum speed is applied to discard points that are too far away from the current cluster.

FIG. 6 discloses calculation of clusters. A cluster has a time, $c_{time}$ and a center c. When a new point arrives, one of the following things happens:

The point is taken into the cluster, and the cluster center and time are be adjusted A new cluster is started The point is discarded The first part of the cluster calculation considers a new data point p. It is first decided whether p can be considered as belonging to the current cluster. This is done by comparing the distance between the current cluster center and the point. The distance must be below the radius of the cluster, maxDist. Note that the radius depends on whether the point p is pre-classified as "moving" or "not moving". If the animal is pre-classified as "moving", the radius of the cluster is set to a pre-defined low value, e.g. 20 centimeters. If the animal is pre-classified as "not moving", the radius of the cluster is set to a pre-defined high value, e.g. 40 centimeters. Furthermore, the time of the new data point is compared to the time of the cluster (latest time of a point in the cluster). If p is both within the time and distance limits, then p is considered as part of the cluster. In this case, the cluster coordinates are adjusted by the formulas:

$$c_x = \frac{c_x \cdot c_{count} + p_x}{c_{count} + 1}$$
$$c_y = \frac{c_y \cdot c_{count} + p_y}{c_{count} + 1}$$
$$c_{count} = c_{count} + 1$$
$$c_{time} = p_{time}$$

Furthermore, the Cluster Module has an algorithm for further processing of the clusters. This algorithm merges neighboring clusters if one of the clusters contains only one point, and the distance between cluster centres is low. The cluster is merged by the following operations: The centre c is calculated as the weighted average of the centre coordinates in the two clusters. The weights are the number of points in the clusters. The time period is from the start of the first cluster to the end of the last cluster. The count of data in the merged cluster is the sum of the two data counts. A cluster is final if it cannot be merged with a neighbouring cluster. The Cluster Module uses the definition of zone boundaries to determine a list of zones that the cluster belongs to. Finally, the cluster is classified as walking or not walking. The cluster is classified as walking if the following requirements are all fulfilled: The cluster center is inside a walking zone. The cluster time interval is less than a certain threshold, e.g. 1 second. If the cluster is classified as walking, the animal is classified as walking in the corresponding time interval. The distance is calculated as the distance between the cluster center and the previous cluster centre.

Important settings for the Cluster Module are:

Radius (maxDist): The radius of the cluster. This is used to determine when to start a new cluster. There are separate values for "moving" and "not moving".

Maximum speed (maxSpeed): The maximum speed. This is used to discard measurements that appear to be outliers. An example of a speed is 120 cm per second.

Maximum time (maxTime): The maximum time between two points in a cluster. An example value is 60 seconds.

Low time (lowTime): This is used to determine the list of confirmed clusters. Clusters are only merged if they cover a time span which is shorter than lowTime. An example value is 10 seconds.

Low count (lowCount): This value is used in the algorithm of merging clusters into confirmed clusters. If a cluster has a low number of data points and is positioned at a distance greater than the maxDist (radius), then the cluster may be ignored in the cluster merge procedure, so instead of merging c1 and c2, the cluster c3 is considered for merge with c1 (if c2 has less data points than lowCount and the distance to c1 is greater than maxDist). An example value of lowCount is 15.

The Activity Module is in charge of calculating, for example:

The accumulated time for walking, standing, sleeping etc.

The animal state changes, e.g. from walking to sleeping

The first calculation in the Activity Module is to take the zones of each cluster and use this to determine the activity. This is done according to the following prioritization:

1: At the watering trough
2: At the feeding table
3: In bed
4: Out definitive
5: Walk
6: Unknown The walking zone is a special case, since the animal may be standing or walking in this zone. When an animal is in the walking zone, the activity is set to standing if the time span of the cluster is more than 1 second. Note that this only applies to the waking zone!

The Activity Module applies no noise reduction.

The activity is reported immediately for each confirmed cluster.

A Kalman filter combines prediction of the animal position (possible speed, etc) with knowledge of the variation in the measurements. The estimate of the animal position and the measurement are combined as a weighted average with a complex algorithm for determining the weights used. The Kalman filter is self-calibrating in the sense that the covariance estimates are updated during runtime based on data observations.

The Kalman filter is configured with the following parameters:

Median length
Observation covariance (e.g. 400)
Model Position Covariance (e.g. 10). Self-calibrating.
Model Speed Covariance (e.g. 10). Self-calibrating.
Reset Timeout (e.g. 10 seconds).

Both location data and activity data are reported to the central backend. For location data the frequency of reporting is configurable, but will typically be once per second or once per two seconds. At the time of reporting the system reports the latest location data for each animal. The activity data is reported at regular intervals. The time between activity reporting can be configured in the configuration file.

The Central Backend runs a number of processes that each performs specific tasks for calculation of animal data. In the Central Backend the following processes are running:

ADIS proxy end point. This process handles the ADIS requests used for integration with GEA Dairy Plan. The central backend generates the necessary ADIS requests.

Note that one ADIS request may contain several data requests.

The Central Backend generates requests every twelve hours, where two requests are generated for each installation: The first of these is a request for all historical data and the second is a request for the current state. These requests (2N where N is the number of installations) are tagged with the installation ID and placed in a queue.

The ADIS proxy checks at short intervals whether there are any queued requests for the current installation by a request to the Central Backend. If one or more requests are found, these are handled by the Location Backend, and the response is sent back to the Central Backend for parsing.

When a response is received in the Central Backend, the response is placed in another queue. The Central Backend checks the response queue at regular intervals (for example every 10 minutes) and parses theresponses.

DCF End Point. This process requests the DCF for animal data every 12 hours. Separate requests are sent for every installation. DCF is accessed via a SOAP web service. Each response is parsed immediately.

Data Consolidation. The task of this process is to store animal data in the GEA CowView database. The format used is the same format for a DCF or a Dairy Plan integration.

The first task of the activity module is to accumulate activity data. The time spend by the cow on, say, sleeping is accumulated until the cow changes state or until one hour has passed. When data has been received for a cow, the following is calculated:

Sums of activity times

Rolling average of activity times

Finally, the animal's current behaviour is compared to the same animal's past behaviour to see whether an alarm for high or low activity should be raised (or an old alarm should be deactivated). For the high activity alarm the current behaviour is calculated based on a relatively short time frame (4 hours) whereas the low activity alarm is raised based on the behaviour during a longer time period. The normal animal behaviour is calculated over an even longer time period spanning several days.

Activity Reference Set. This process calculates the behavioural characteristics of animals in a reference group. This is used to show the normal behaviour of a cow in the polar plot.

Virtual Group Classification. This process calculates which virtual group each animal belongs to. This may be, for example, "Young stock" or "Pre calving heifers". The purpose is to apply different levels for the alarms for animals in various states. The virtual group is written to the database for each animal, and the value is used for the calculation of alarms by the "activity process".

Inspection Lists. This process assigns animals to inspection lists, for example cows that have recently given birth.

Core API. The Core API is the interface used by the Location Backend to retrieve various data and settings and to report data back to the Central Backend and database.

The following can be retrieved by the Location Backend:

Boundaries

Hosts (animals)

Tags

Module settings, i.e. parameters for modules in Location Backend

The following data can be pushed from the Location Backend to the Central Backend:

Activities

Real-time positions

ADIS API. The API for handling ADIS messages has the following methods:

Get ADIS messages: Used by the ADIS proxy to retrieve the requests queued for the current installation Set ADIS messages: Used by the ADIS proxy to return the ADIS responses Send Log Entries: This method is used by programmers for debugging Interaction with Web Applications. The two web applications, the PDA web application and the animal View Portal interact with the Central Backend by method calls on the PHP layer. In other words, the web service APIs described above is not used for the web applications. The PDA web application has a special protocol for exchanging data between the PHP layer and the Flash layer. This is defined by exchanging data in a special XML format. This layer is called the "PDA Proxy".

The invention claimed is:

1. An animal position sensing system for measuring real time positions of a plurality of animals, the system comprising:
    a plurality of sensors;
    a plurality of radio receiver/transmitter tags and each receiver/transmitter tag is carried by one of the plurality of animals;
    a delay measuring device in radio communication between the radio receiver/transmitter tags and the sensors to calculate the actual position of each animal with a receiver/transmitter tag, wherein the sensors further communicate with a plurality of reference radio receiver/transmitter tags, to calibrate the real time position measured by the system and a Central Processing Unit (CPU) having at least two cores, and the system divides the data processing in a first real time position processing in the first core of the processor, and into a second processing of the activity of the animals in the second core of the processor.

2. The system of claim 1, wherein the input for measurement of the real time position is performed by a Real Time Location System (RTLS).

3. The system of claim 1, wherein the first CPU core includes a quick noise reduction algorithm for generating a display of an animal position overview.

4. The system of claim 1, wherein the system uses the second CPU core to perform noise reduction analysis of the data to analyze the activity of the animals.

5. The system of claim 3, wherein data is received from an interface to the RTLS, and a timestamp is applied to each piece of data.

6. The system of claim 5, wherein the sensors provide position data to a First-In-First-Out stack, where the oldest measurements are processed first.

7. The system of claim 6, wherein the system processes a plurality of strings of location information at the same time, in a predetermined number of parallel processing threads in a configuration file.

8. An animal position sensing system for measuring real time positions of a plurality of animals, the system comprising:
    a plurality of sensors;
    a plurality of radio receiver/transmitter tags carried by the plurality of animals;
    a measuring device for measurement of delay in radio communication between the radio receiver/transmitter tags and the sensors to calculate the actual position of each animal with a receiver/transmitter tag, wherein the sensors further communicate with a plurality of reference radio receiver/transmitter tags, and the system measures the position for the reference radio receiver/transmitter tags to perform a calibration, which system comprises a Central Processing Unit having at least two cores, and the system divides the data processing a first real time position in the first core of the processor, and a second processing of the activity of the animals performed in the second core of the processor;
    wherein the sensors provide position data to a First-In-First-Out stack, where the oldest measurements are processed first;
    wherein the system processes several strings of location information at the same time, in a predetermined-number of parallel processing threads in a configuration file, and the system further comprises:

a Movement Module, which receives time stamped Real Time Location positioning data, and generates an output as a point with a zone attribute, and the Movement Module comprises noise reduction filters including Median and Exponentially Weighted Moving Average.

9. The system of claim 8, and further compromising:
a cluster module defined by an aggregated set of location points where the points calculated by the Movement Module are aggregated into a cluster if they are within a predetermined range of positions at a predetermined range of time.

10. The system of claim 9, and further comprising:
an Activity module that defines at least the following:
- 1: At the watering trough
- 2: At the feeding table
- 3: In bed
- 4: Out definitive
- 5: Walk
- 6: Standing
- 7: Unknown.

11. The system of claim 10, wherein the activity module accumulates activity data for each animal, and the Activity module analyses an animal's current behavior compared to the same animal's past behavior to set an alarm for high or low activity, wherein for the high activity alarm the current behavior is calculated based on a relatively short time frame, whereas the low activity alarm is raised based on the behavior during a longer time period, where normal animal behavior is calculated over an even longer time period spanning a plurality of days.

12. The system of claim 11, wherein the system comprises a Kalman filter, that combines animal position parameters selected from the group: prediction of the animal position and possible animal speed; to perform an estimate of the animal position and the measurements are combined as a weighted average.

13. The system of claim 12, and further comprising:
a Central Backend computer system that performs a number of specific tasks for calculation of animal data.

14. The system of claim 13, wherein the Central Backend computer system handles an ADIS request used for integration with one or more defined Dairy Plans, and generates a plurality of ADIS requests.

15. The system of claim 14, wherein the Central Backend computer system generates ADIS requests as needed, and where at least two requests are generated for each installation, the first of these is a request for all historical data and the second is a request for the current state.

* * * * *